United States Patent [19]

Davis et al.

[11] 4,321,740
[45] Mar. 30, 1982

[54] METHODS AND APPARATUS FOR RELINING SERVICE PIPE

[75] Inventors: George W. Davis, Warren; Hank Kulzer, Bridgewater, both of N.J.; Anker Nielsen, Holden, Mass.

[73] Assignee: Inner-Tite Corporation, Springfield, N.J.

[21] Appl. No.: 149,518

[22] Filed: May 13, 1980

[51] Int. Cl.³ ............................................. B21D 39/04
[52] U.S. Cl. .............................. 29/402.09; 29/421 R; 29/523; 138/97
[58] Field of Search ............... 72/402.09, 402.01, 523, 72/421 R; 138/97, 98

[56] References Cited

U.S. PATENT DOCUMENTS

| | | | |
|---|---|---|---|
| 3,297,029 | 1/1967 | Brinkman | 128/188 |
| 3,306,635 | 2/1967 | Ferguson | 285/55 |
| 3,307,996 | 3/1967 | Keneipp | 138/97 |
| 3,462,821 | 8/1969 | Cours | 29/200 |
| 3,568,721 | 3/1971 | Ross | 138/97 |
| 3,885,298 | 5/1975 | Pogonowski | 29/523 |
| 3,897,619 | 8/1975 | Thivans | 29/421 |
| 4,069,573 | 1/1978 | Rogers | 29/421 R |
| 4,075,755 | 2/1978 | Bernatt | 29/421 |

*Primary Examiner*—Gene P. Crosby
*Attorney, Agent, or Firm*—Buell, Blenko, Ziesenheim & Beck

[57] ABSTRACT

A method and apparatus are provided for relining a fluid transmission pipe in which a deformable stiffener is inserted in one end of a plastic liner, the plastic liner is inserted into the transmission line with the stiffener first, a plastic sealant is placed around the end of the plastic liner in the transmission pipe and the stiffener is expanded intermediate its ends in the plastic liner to force the liner end into tight contact with the transmission pipe interior with sealant surrounding the contact area.

11 Claims, 6 Drawing Figures

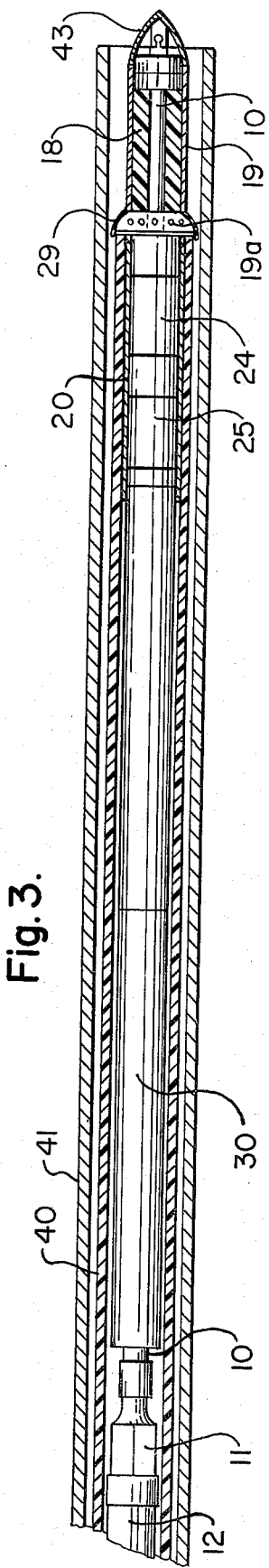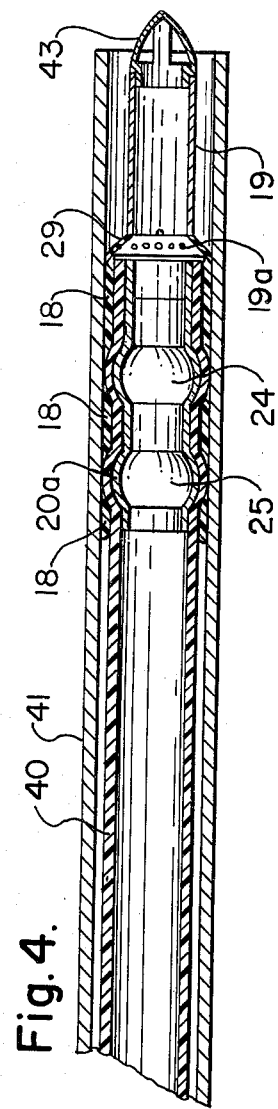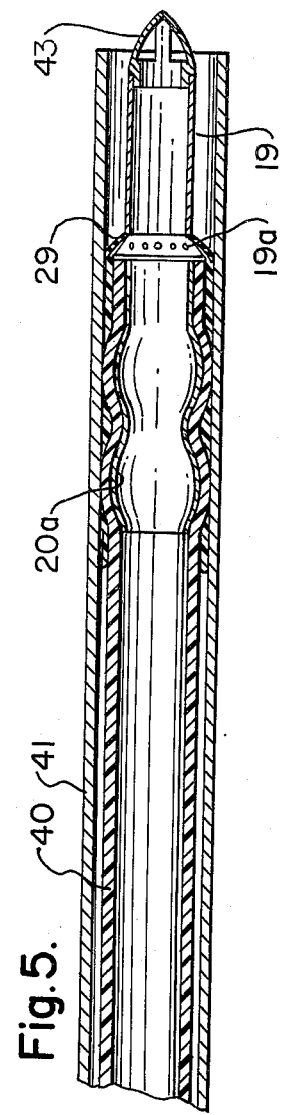

METHODS AND APPARATUS FOR RELINING SERVICE PIPE

This invention relates to methods and apparatus for relining service pipe, and particularly to a method and apparatus for inserting a plastic pipe liner in a metal service pipe without digging up the service pipe.

There are many installations for delivery of fluid materials to industries and particularly households, such as gas and water service lines, which were originally installed as metal lines and have been in place for many years. Corrosion has in many cases taken its toll and these lines must be replaced to prevent leakage and, particularly in the case of gas service lines, to prevent the possibility of explosion. In order to repair such lines it has been necessary to dig them up and replace the entire line or more recently to dig up at least the connection to the service main and install a plastic liner in the old service line and connect the same by a service head adapter to the main. Typical of the more recent practices are those illustrated in Leopold U.S. Pat. No. 3,814,466, Nicolaus U.S. Pat. No. 3,591,208 and Davis U.S. Pat. No. 4,062,572. While this latter practice eliminates the need for digging up and replacing the entire service line, it still requires digging an access hole at the junction of the service line and main. This frequently requires digging up a portion of a street or roadway and is always expensive and time consuming.

We have invented a new method of relining underground fluid transmission lines such as gas service lines and an apparatus for accomplishing the same which entirely eliminates the need to dig up any part of the service line. Our invention makes it possible to reline the usual service line from the interior of a building by simply opening the line where it enters the building and inserting a plastic liner and the seal fitting according to this invention through the service line to the main.

We provide a method of relining a fluid transmission line such as a gas line, and will describe the invention in the context of relining a service line from the interior of a building being served by opening the line at the building entry, inserting a deformable metal sleeve in one end of a plastic liner, inserting said plastic liner with said one end first into the length of service line to be relined, placing a plastic sealant around said one end of the plastic liner, and expanding said metal sleeve in said one end intermediate its ends to force the liner into tight engagement with the service line and force sealant tightly around the liner on each side of its engagement with the service line. We also provide an apparatus for relining a service line as described above comprising an elongate piston rod having a fluid passage therethrough, a connection at one end, a fluid pressure hose removably connected to said connection, an annular piston intermediate the ends of said piston rod surrounding said rod, an elongate hydraulic cylinder surrounding a portion of said piston rod, a removable annular head on the other end of said piston rod having an outer diameter substantially the same as the outer diameter of said cylinder, a cylinder head on one end of said cylinder remote from said one end of the piston rod and having an annular passage sealing passing said piston rod, at least one rigid annular spacer spaced from said cylinder head having an axial passage surrounding said piston rod between said annular head on said piston rod and said cylinder head, at least one annular expandable resilient spacer between said cylinder head and said rigid spacers, a fluid port in the piston rod adjacent the piston communicating into the interior of the cylinder between the piston and cylinder head, an annular expandable stiffener member slidable over said expandable resilient spacer and said rigid spacer, a stop member on the spacer nearest the annular head, sealant reservoir means slidable over said piston rod abutting said stiffener means at the end opposite said cylinder head, said reservoir means having an interior bore slidably receiving said annular head on the piston rod and abutting the stop member on said rigid spacer. Said reservoir being filled with an extrudable sealant, passage means in said reservoir means adjacent the stiffener means, resilient cuff means on the exterior of said reservoir means adjacent said passage means extending between said reservoir means and the interior of a service line to be lined, a plastic liner slidably received over said cylinder and stiffener member with an end substantially abutting and under said cuff means, and means delivering fluid under pressure to said fluid pressure hose to deliver fluid through said fluid port to cause the piston rod to move lengthwise in the cylinder to first extrude sealant from the reservoir means into the interior of the service line and around the end of the plastic liner surrounding the stiffener means and then expand the expandable means to expand a portion of the stiffener means into an annular ring forcing the plastic liner into tight engagement with the interior of said service line. Preferably two expandable resilient spacer means are provided separated by a rigid annular spacer means so as to form two spaced annular projections on the stiffener means. The piston rod is preferably also provided with two spaced apart annular pistons in the cylinder means with an oil port adjacent each so as to provide a double piston effect. The stiffener means and reservoir are preferably formed as a unit with the passage means in the reservoir in the form of radial holes adjacent the juncture of stiffener means and reservoir. The cuff means is preferably a rubber sheet cuff surrounding the sealant reservoir and overlying said passages.

In the foregoing general description of our invention we have set out certain objects, purposes and advantages. Other objects, purposes and advantages of the invention will be apparent from a consideration of the following description and the accompanying drawings in which:

FIG. 3 is a section through a service line and plastic liner showing the apparatus of this invention in place in a service line to be lined prior to expansion of the stiffener means;

FIG. 4 is a section as in FIG. 3 showing the stiffener means expanded with the tool still in place;

FIG. 5 is a section as in FIGS. 3 and 4 with the tool removed and the lining completed.

Figure 1:
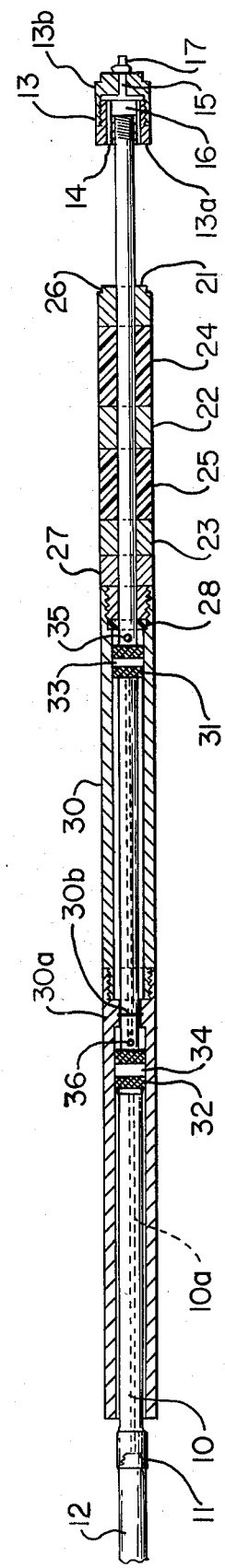
FIG. 1 is a section through a preferred form of apparatus according to this invention.
Figure 6:
FIG. 6 is a side elevational view of a bullnose for use with the invention.
Figure 2:
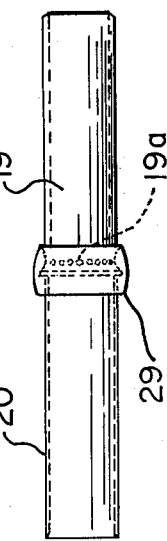
FIG. 2 is a side elevational view of a preferred stiffener means and reservoir assembly according to this invention.

Referring to the drawings we have illustrated a preferred form of tool according to this invention having an elongate hollow piston rod 10 with a coupling 11 at one end for receiving a fluid hose 12. The other end of rod 10 carries a head 13 threaded thereon. The hollow 10a in piston rod 10 preferably terminates intermediate its ends as shown. The head 13 is preferably in the form of a cylinder made up of two parts, an injection cap 13a having spaced passages 14 parallel to the piston rod 10, and a cover cap 13b threaded onto said injection cap portion and having an axial passage 15 and well 16 communicating with passages 14. A one way grease gun fitting such as an Alemite fitting 17 is provided in the end of axial passage 15 through which fluid plastic sealant 18 is pumped to fill sealant reservoir 19 around rod 10. A stiffener member 20, preferably fixed to the end of reservoir 19 is slidably received over alternate rigid spacer 21, 22 and 23 and expandable resilient spacers 24 and 25 therebetween to butt against stop member 26 on spacer 21. Spacers 21–25 all surround rod 10 which is freely movable in an axial passage in each. Spacer 23 abuts cylinder head 27 which carries seals 28 around rod 10. A rubber cuff 29 covers ports 19a in reservoir 19 adjacent stiffener 20. An elongate cylinder 30 extends from cylinder head 27 coaxially of piston rod 10 to a point adjacent connection 11. An intermediate cylinder head 30a is provided in cylinder 30 carrying seal 30b around rod 10. A pair of spaced pistons 31 and 32 are fixed on rod 10 within cylinder 30 and are provided with seals 33 and 34 sealingly engaging the internal wall of cylinder 30. Fluid ports 35 and 36 are provided adjacent each of pistons 31 and 32 on the cylinder head sides of the same.

In operation a plastic pipe or liner 40 is placed over fluid hose 12, cylinder 30, and stiffener 20 to abut the rubber cuff 29. The plastic liner 40 with hose 12, cylinder 30, stiffener 20, rod 10, sealant 18, bullnose 43 frictionally fitted and the remaining structure described above is threaded through a service line 41 to be lined until the portion to be lined is covered by the new liner. At this point the head 13 and bullnose 43 covering the same may extend into the main and the arrangement will be as in FIG. 3. Pressure fluid is then fed into hose 12, through piston rod 10, out ports 35 and 36 between cylinder head 27 and piston 31 and cylinder head 30a and piston 32 to force piston rod 10 to the left viewing the figures. This will first draw head 13 into sealant reservoir 19 forcing sealant 18 out through ports 19a under cuff 29 and leftwardly over liner 40 and inside service line 41. When the sealant is all ejected, head 13 abuts rigid spacer 21 which exerts pressure leftward causing the expandable spacers 24 and 25 to expand radially against stiffener 20 and then to expand stiffener 20 in the same manner to form annular rings 20a forcing liner 40 into tight contact with the interior of service line 41 and compression sealant 18 between said expanded areas. When the liner has been tightly expanded with stiffener 20, the fluid pressure is removed and the head 13 moves to the right relaxing expandable spacers 24 and 25. The expansion apparatus can then be removed from line 40 and the other end of line 40 connected to the house line with one of the conventional connectors mentioned above.

In the foregoing specification we have set out certain preferred practices and embodiments of our invention, however, it will be understood that this invention may be otherwise embodied within the scope of the following claims.

We claim:

1. A method of relining a fluid transmission line from an access point on the line to a point remote therefrom comprising the steps of:
   a. opening said transmission line at the access point, inserting a deformable stiffener in one end of a plastic liner;
   b. inserting said plastic liner with said one end and stiffener first into the length of transmission line to be relined;
   c. placing a plastic sealant around said one end of said plastic liner in place between said liner and transmission line; and
   d. expanding said stiffener intermediate its ends in said one end of said liner forcing said liner into tight engagement with the transmission line.

2. A method as claimed in claim 1 wherein the stiffener is a metal sleeve.

3. An apparatus for relining a service line comprising a hollow elongate piston rod having an axial fluid passage therethrough, a connection at one end, a fluid pressure line removably connected to said connector, an annular piston intermediate the ends of said piston rod surrounding said rod, an elongate hydraulic cylinder surrounding a portion of said piston rod including said piston, a removable annular head on the other end of said piston rod spaced from one end of said cylinder, said head having an outer diameter substantially the same as the outer diameter of the cylinder, a cylinder head on one end of said cylinder remote from said one end of the piston rod and having an annular passage sealingly surrounding said piston rod, at least one rigid annular spacer spaced from said annular head having an axial passage surrounding said piston rod between said annular head and said cylinder head, annular stop means on said annular spacer, an annular expandable resilient spacer between said cylinder head and rigid spacer, a fluid port in the piston rod adjacent the piston communicating between the interior of the piston rod and the interior of the cylinder between the cylinder head and piston, an annular deformable stiffener member slidable over said resilient spacer and said rigid spacer, sealant reservoir means slidable over said piston rod head and abutting said stop means on said rigid spacer, said reservoir means being filled with flowable sealant, port means in said reservoir means adjacent the stiffener means, resilient cuff means surrounding said reservoir means adjacent said port means and extending between said reservoir means and the interior of a service line to be lined, said cylinder and stiffener means adapted to slidably receive a plastic liner for placement in said service line, and means delivering fluid under pressure to said fluid pressure line to deliver fluid through said fluid port in the piston rod to cause the piston rod to move lengthwise in the cylinder first to extrude sealant from the reservoir means into the interior of the service line around the end of the plastic liner and then to expand expandable means within the stiffener means to deform the stiffener means in an annular ridge forcing the plastic liner into tight engagement with the interior of the service line.

4. An apparatus as claimed in claim 3 wherein said annular head includes passage means communicating through the head to the interior of said reservoir means, and a filler check means on the end of said passage remote from the reservoir means.

5. An apparatus as claimed in claim 4 wherein the filler check means is a one way fitting.

6. An apparatus as claimed in claim 3 or 4 having two or more expandable resilient spacer means each separated by a rigid annular spacer means to engage the stiffener means at two or more spaced apart annuli.

7. An apparatus as claimed in claim 3 or 4 wherein the piston rod is provided with two spaced apart annular pistons in the cylinder means with an oil port adjacent each annular piston.

8. An apparatus as claimed in claim 3 or 4 wherein the stiffener means and reservoir means are formed as an integral unit with radial passages adjacent the juncture of stiffener means and reservoir means.

9. An apparatus as claimed in claim 3 or 4 wherein the cuff means is a cylinder of rubber bent back upon itself and overlying the port means in the reservoir.

10. An apparatus as claimed in claim 3 or 4 or 5 wherein the annular head is formed in two parts, an injection cap having spaced passages generally parallel to the piston rod and a cover cap threaded thereon having a central well communicating with said spaced passages, a central axial passage from the outside to said well and a check valve fitting in said passage.

11. An apparatus as claimed in claim 10 wherein a bullnose frictionally engages and covers the annular head.

* * * * *